US009065141B2

(12) United States Patent
Merzougui et al.

(10) Patent No.: US 9,065,141 B2
(45) Date of Patent: Jun. 23, 2015

(54) BORON-DOPED DIAMOND COATED CATALYST SUPPORT

(75) Inventors: Belabbes Merzougui, Manchester, CT (US); Minhua Shao, Manchester, CT (US); Lesia V. Protsailo, Bolton, CT (US)

(73) Assignee: AUDI AG, Ingolstadt (DE)

( * ) Notice: Subject to any disclaimer, the term of this patent is extended or adjusted under 35 U.S.C. 154(b) by 689 days.

(21) Appl. No.: 13/148,552

(22) PCT Filed: Feb. 10, 2009

(86) PCT No.: PCT/US2009/000844
§ 371 (c)(1),
(2), (4) Date: Aug. 9, 2011

(87) PCT Pub. No.: WO2010/093344
PCT Pub. Date: Aug. 19, 2010

(65) Prior Publication Data
US 2011/0311904 A1 Dec. 22, 2011

(51) Int. Cl.
| | |
|---|---|
| *H01M 4/86* | (2006.01) |
| *H01M 4/90* | (2006.01) |
| *H01M 4/92* | (2006.01) |
| *H01M 4/88* | (2006.01) |
| *B01J 21/18* | (2006.01) |
| *B01J 23/42* | (2006.01) |
| *B01J 35/10* | (2006.01) |
| *C01B 31/06* | (2006.01) |
| *H01M 8/10* | (2006.01) |

(52) U.S. Cl.
CPC .............. *H01M 4/92* (2013.01); *H01M 4/9075* (2013.01); *H01M 4/9041* (2013.01); *H01M 4/8647* (2013.01); *H01M 4/8803* (2013.01); *B01J 21/18* (2013.01); *B01J 23/42* (2013.01); *B01J 35/1004* (2013.01); *C01B 31/06* (2013.01); *H01M 4/921* (2013.01); *H01M 4/926* (2013.01); *H01M 2008/1095* (2013.01); *Y02E 60/50* (2013.01)

(58) Field of Classification Search
USPC .......................... 429/517–522, 523–534, 535
See application file for complete search history.

(56) References Cited

U.S. PATENT DOCUMENTS

| 5,591,484 A * | 1/1997 | Poncelet et al. .......... 427/249.11 |
| 5,776,323 A | 7/1998 | Kobashi |
| 6,533,916 B1 | 3/2003 | Puetter et al. |
| 6,884,290 B2 | 4/2005 | Swain et al. |

(Continued)

FOREIGN PATENT DOCUMENTS

| JP | 09-013188 A | 1/1997 |
| JP | 2000-313982 A | 11/2000 |
| JP | 2008-230905 A | 10/2008 |

OTHER PUBLICATIONS

J. Wang, et al., "Fabrication and Evaluation of Platinum/Diamond Composite Electrodes for Electrocatalysis," from Journal of The Electrochemical Society, 150 (1) E24-E32 (2003).

(Continued)

*Primary Examiner* — Basia Ridley
*Assistant Examiner* — Caitlin Wilmot
(74) *Attorney, Agent, or Firm* — Seed IP Law Group PLLC

(57) ABSTRACT

A catalyst support for an electrochemical system includes a high surface area refractory material core structure and boron-doped diamond. The BDD modifies the high surface area refractory material core structure.

16 Claims, 4 Drawing Sheets

(56) References Cited

U.S. PATENT DOCUMENTS

| | | |
|---|---|---|
| 7,144,753 B2 | 12/2006 | Swain et al. |
| 2006/0188774 A1 | 8/2006 | Niu et al. |
| 2011/0143934 A1* | 6/2011 | Shao et al. .................. 502/313 |

OTHER PUBLICATIONS

J. Bennett, et al., "Pulsed Galvanostatic Deposition of Pt Particles on Microcrystalline and Nanocrystalline Diamond Thin-Film Electrodes," from Journal of The Electrochemical Society, 152 (5) E184-E192 (2005).

A. Fischer, et al., "Preparation and Electrochemical Characterization of Carbon Paper Modified with a Layer of Boron-Doped Nanocrystalline Diamond," from Journal of The Electrochemical Society, 154 (9) K61-K67 (2007).

G. Salazar-Banda, et al., "Boron-doped diamond powder as catalyst support for fuel cell applications," from Electrochemistry Communications 9, pp. 57-64 (2007).

I. Gerger, et al., "Gradient layers of boron-doped diamond on titanium substrates," from Diamond & Related Materials 16, pp. 899-904 (2007).

H. Suffredini, et al., "AFM Studies and Electrochemical Characterization of Boron-Doped Diamond Surfaces Modified with Metal Oxides by the Sol-Gel Method," from J. Braz. Chem. Soc., vol. 17, No. 2, pp. 257-264 (2006).

G. R. Salazar-Banda, et al., "Improved Stability of PtOx Sol-Gel-Modified Diamond Electrodes Covered with Nafion Film," from UJ. Braz. Chem. Soc., vol. 16, No. 5, pp. 903-906 (2005).

A. Kraft, "Doped Diamond: A Compact Review on a New, Versatile Electrode Material," from Int. J. Electrochem. Sci., 2, pp. 355-385 (2007).

International Search Report, mailed Apr. 30, 2009, for International Application No. PCT/US2009/000844, 3 pages.

Salazar-Banda et al., "Boron-doped diamond powder as catalyst support for fuel cell applications," *Electrochemistry Communications* 9:59-64, Sep. 2007.

Suffredini et al., "Electro-oxidation of methanol and ethanol using a Pt-RuO$_2$/C composite prepared by the sol-gel technique and supported on boron-doped diamond," *Journal of Power Sources* 158:124-128, 2006.

* cited by examiner

BORON-DOPED DIAMOND COATED CATALYST SUPPORT

BACKGROUND

The present invention relates to a catalyst support. More particularly, the present disclosure relates to a high surface area catalyst support for use, for example, in a fuel cell.

Electrodes containing supported metal catalyst particles are used in electrochemical cells, such as fuel cells. For example, in a conventional hydrogen fuel cell, a supported platinum catalyst is used to oxidize hydrogen gas into protons and electrons at the anode of the fuel cell. At the cathode of the fuel cell, another supported platinum catalyst triggers an oxygen reduction reaction (ORR), leading to the formation of water.

The catalyst support is typically a conductive high surface area carbon. The catalyst support provides a surface over which the catalyst particles are dispersed and stabilized. However, carbon catalyst supports in fuel cells are susceptible to corrosion that results in carbon oxidation and, as a final stage, collapse of the carbon structure. Causes of corrosion include the presence of oxygen, water, and high electrode potential, especially on the cathode side. Additionally, mixed potential resulting from the electrochemical reaction may exist locally. Corrosion causes microstructural derogation and surface chemistry changes, which may result in an irreversible loss in catalytic performance, cross-over and ultimately in the complete failure of the fuel cell.

Additionally, the carbon support may have poor interactions with the catalyst particles, which results in electrode changes, and more specifically, particle growth of catalyst particle sizes under dissolution/redeposition processes. The increase in size of the catalyst particles through dissolution/redeposition causes a loss in fuel cell performance. An improve catalyst support that resists corrosion is needed so that the performance of an electrochemical cell can be maintained.

SUMMARY

A catalyst support for an electrochemical system includes a high surface area refractory material core structure and boron-doped diamond (BDD). The BDD modifies the high surface area refractory material core structure.

It is noted that the drawings are not scale.

DETAILED DESCRIPTION

A catalyst support structure is described herein which includes boron-doped diamond (BDD) modifying a high surface area refractory catalyst support structure. The BDD and the refractory material produce a stabilized catalyst support structure, which can be used in fuel cells and other electrochemical devices as a support for catalyst particles, such as platinum. These catalyzed catalyst support structures typically form the basis for electrochemical cell catalyst layers.

Figure 1:
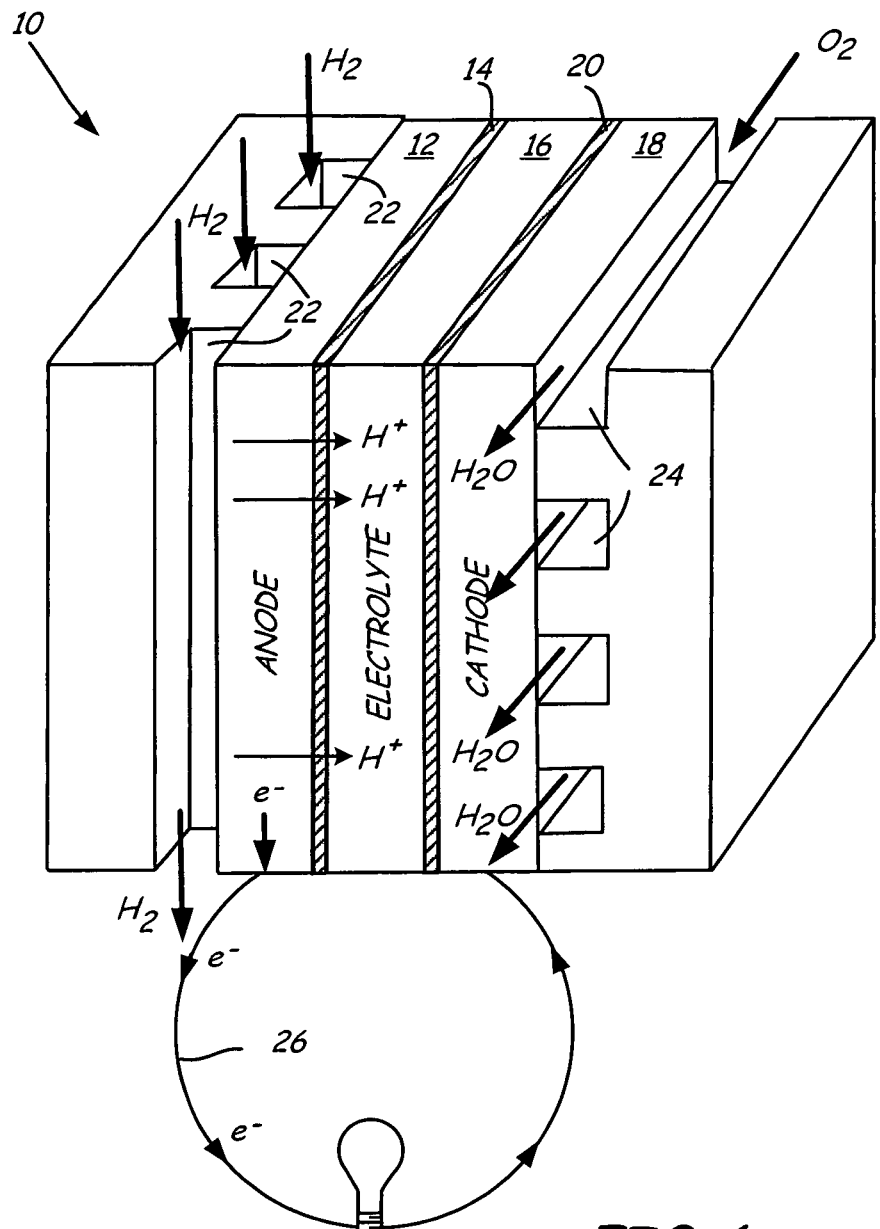
FIG. 1 is a schematic of a fuel cell that uses the catalyst supports described herein.

FIG. 1 is one example fuel cell 10, designed for generating electrical energy, that includes anode gas diffusion layer (GDL) 12, anode catalyst layer 14, electrolyte 16, cathode gas diffusion layer (GDL) 18, and cathode catalyst layer 20. Anode GDL 12 faces anode flow field 22 and cathode 18 GDL faces cathode flow field 24. In one example, fuel cell 10 is a fuel cell using hydrogen as fuel and oxygen as oxidant. It is recognized that other types of fuels and oxidants may be used in fuel cell 10.

Anode GDL 12 receives hydrogen gas ($H_2$) by way of anode flow field 22. Catalyst layer 14, which may be a platinum catalyst, causes the hydrogen molecules to split into protons ($H^+$) and electrons ($e^-$). While electrolyte 16 allows the protons to pass through to cathode 18, the electrons travel through an external circuit 26, resulting in a production of electrical power. Air or pure oxygen ($O_2$) is supplied to cathode 18 through cathode flow field 24. At cathode catalyst layer 20, oxygen molecules react with the protons from anode catalyst layer 14 to form water ($H_2O$), which then exits fuel cell 10, along with excess heat.

Catalyst particles dispersed and stabilized on catalyst support structures can from the basis of anode catalyst layer 14 and cathode catalyst layer 20. In one example, the catalyst particles are platinum. As described above, cathode catalyst layer 20 is used to increase the rate of the oxygen reduction reaction (ORR) ultimately resulting in the formation of water from protons, electrons and oxygen. Cathode catalyst layer 20 contains platinum as a catalyst but the platinum is unstable in this environment. During potential cycling, platinum atoms tend to dissolve and redeposit. This dissolution/redeposition process results in catalyst particle growth that decreases the performance of the fuel cell.

In one example, fuel cell 10 is a polymer electrolyte membrane (PEM) fuel cell, in which case electrolyte 16 is a proton exchange membrane formed from a solid polymer. In another example, fuel cell 10 is a phosphoric acid fuel cell, and electrolyte 16 is liquid phosphoric acid, which is typically held within a ceramic (electrically insulating) matrix.

Figure 2:
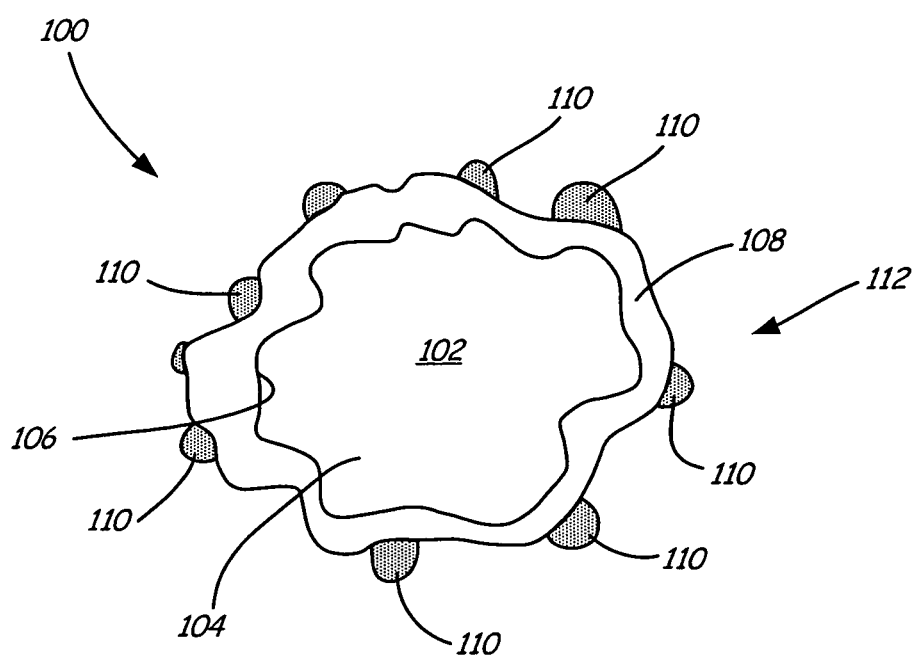
FIG. 2 is a cross-sectional view of a catalyzed catalyst structure having catalyst particles deposited on a continuous layer of boron-doped diamond (BDD).

FIG. 2 is a cross-sectional view of catalyzed catalyst support structure 100 that can be used, for example, as basis for anode catalyst layer 14 and cathode catalyst layer 20 in fuel cell 10. Catalyzed catalyst support structure 100 includes high surface area refractory catalyst support structure 102 (having inner surface 104 and outer surface 106), boron-doped diamond (BDD) 108 and catalyst particles 110. For convenience, catalyzed catalyst support structure 100 will be referred to as having outer surface 112. Outer surface 112 is in contact with the environment surrounding catalyzed catalyst support structure 100. Refractory support structure 102 is modified by a continuous layer of BDD 108. Catalyst particles 110 are dispersed and stabilized on BDD 108.

Refractory catalyst support structure 102 is a high surface area refractory material, such as a metal oxide, a metal phosphate, a metal boride, a metal nitride, a metal silicide, a metal carbide and combinations thereof. Example refractory materials include, but are not limited to, $TiO_2$, $ZrO_2$, $WO_3$, $TaO_2$, $Nb_2O_3$, $TaPO_x$, $BPO_x$, $ZrPO_x$, $TiPO_x$, $TiB_2$, TiC, WC, WSi, BC, BN, SiC, ZrN, $TaB_2$ and NbC. Refractory support structure 102 provides an increased surface area for the dispersion of catalyst particles 110, allowing a greater number of catalyst particles 110 to be dispersed on support structure 102. In one example, refractory catalyst support structure 102 is a powder. In another example, refractory catalyst support structure 102 has a surface area between about 10 and about 2000 $m^2/g$.

BDD 108 is located on outer surface 106 of refractory catalyst support structure 102 and modifies outer surface 106. BDD 108 forms a continuous layer on refractory catalyst support structure 102 so that catalyst support structure 102 is not exposed at outer surface 112 to the environment surrounding catalyzed catalyst support 100. As will be explained in detail below, BDD 108 improves the stability of catalyzed catalyst support structure 100. For example, BDD 108 provides corrosion resistance when catalyzed catalyst support structure 100 is used in the presence of water, oxygen, and high electrode potential, such as the conditions present on the cathode side of a fuel cell. Although the continuous layer of BDD 108 is illustrated as having a generally homogenous thickness, the thickness of BDD 108 may be non-homogenous such that the thickness of BDD 108 varies on catalyst support structure 102.

Catalyst particles 110 are deposited on BDD 108. Catalyst particles 110 can be a catalyst for an oxidation reduction reaction (ORR). For example, catalyst particles 110 can be catalyst particles for use in a fuel cell or other electrochemical device. In one example, catalyst particles 110 are platinum or binary, ternary or quaternary platinum alloys or combinations thereof.

High surface area refractory catalyst support structure 102 and BDD 108 are stable in the high potential environments presented by electrochemical systems, such as fuel cells. Refractory catalyst support structure 102 stabilizes catalyst particles 110 on support structure 102 due to the strong metal-support interaction (SMSI) characteristics of the refractory material. The SMSI characteristics of refractory catalyst support structure 102 prevent or at least slow down the rate of dissolution/redeposition of catalyst particles 110, enhancing the oxidation reduction reaction (ORR) activities of catalyst particles 110.

However, some refractory materials, such as metal oxides and phosphates, are generally non-conductive and extremely hydrophilic. When such refractory materials are present, BDD 108 provides the necessary conductivity for catalyst support structure 102. In one example, BDD 108 has a conductivity equal to or greater than about 0.05 Siemens/centimeter (S/cm) at operating temperatures equal to or greater than about 100° C. In another example, BDD 108 has a conductivity equal to or greater than about 0.1 Siemens/centimeter (S/cm) at operating temperatures equal to or less than about 100° C. Additionally, BDD 108 plays a significant role in balancing the physical properties of catalyzed catalyst support 100. For example, the hydrophobic characteristic of BDD 108 compensates for the hydrophilic characteristic of the refractory material of catalyst support structure 102. These physical properties are important for water and reactant management in an electrochemical device, such as a fuel cell.

BDD 108 also provides corrosion resistance when catalyzed catalyst support 100 is used in the presence of water, oxygen and high electrode potential. BDD 108 provides corrosion resistance especially at voltage as high as 1.2V/RHE. Thus, BDD provides corrosion resistance when catalyzed catalyst support 100 is used in an electrochemical device, such as a fuel cell.

Refractory catalyst support structure 102 having BDD 108 has an increased stability and improved corrosion resistance in harsh environments such as those present in a fuel cell. In one example, refractory catalyst support structure 102 is a powder and a plurality of catalyzed supports 100 can be used to form the basis of a catalyst layer of an electrode, such as anode catalyst layer 14 and cathode catalyst layer 20 in fuel cell 10 of FIG. 1. Catalyst particles 110 on catalyst support 100 will experience less dissolution and redeposition during potential cycling compared to catalyst particles on a conventional carbon support structure. Catalyst support 100 experiences less corrosion and the performance of the fuel cell is improved.

Figure 3:
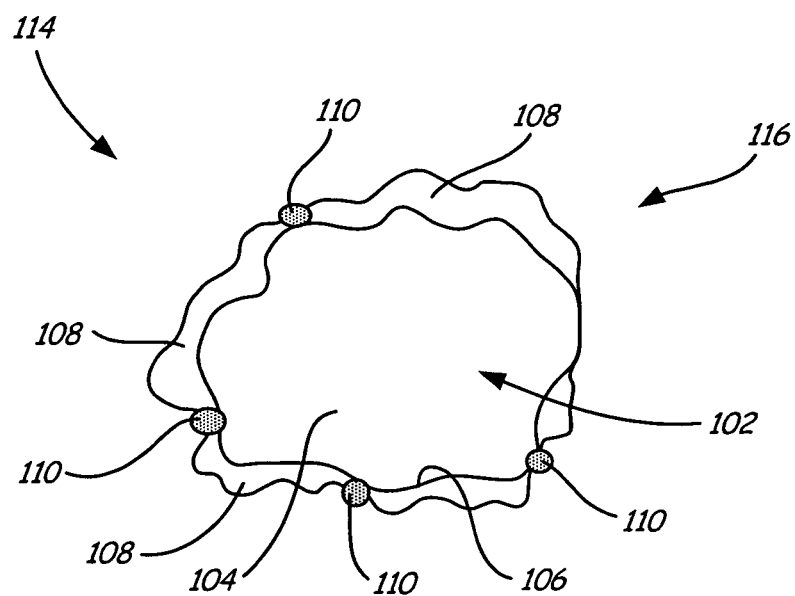
FIG. 3 is a cross-sectional view of a catalyzed catalyst structure having a non-continuous layer of boron-doped diamond (BDD) and catalyst particles dispersed and engaged with a catalyst support structure and the BDD layer

FIG. 3 is a cross-sectional view of catalyst support structure 114, which includes high surface area refractory catalyst support structure 102 (having inner surface 104 and outer surface 106), boron-doped diamond (BDD) 108 and catalyst particles 110. For convenience, catalyzed catalyst support structure 114 will be referred to as having outer surface 116. Outer surface 116 is in contact with the environment surrounding support structure 114. Refractory support structure 102 is modified by a non-continuous layer of BDD 108. Catalyst particles 110 are dispersed and engaged with refractory catalyst support structure 102 and BDD 108.

Refractory catalyst support structure 102 is a high surface area refractory material, such as a metal oxide, a metal phosphate, a metal boride, a metal nitride, a metal silicide, a metal carbide and combinations thereof. Example refractory materials include, but are not limited to, $TiO_2$, $ZrO_2$, $WO_3$, $TaO_2$, $Nb_2O_3$, $TaPO_x$, $BPO_x$, $ZrPO_x$, $TiPO_x$, $TiB_2$, TiC, WC, WSi, BC, BN, SiC, ZrN, $TaB_2$ and NbC. Refractory catalyst support structure 102 provides an increased surface area for the dispersion of catalyst particles 110, allowing a greater number of catalyst particles 110 to be dispersed on refractory catalyst support structure 102. In one example, refractory catalyst support structure 102 is a powder. In another example, refractory catalyst support structure 102 has a surface area between about 10 and about 2000 $m^2/g$.

BDD 108 is located on outer surface 106 of refractory catalyst support structure 102. BDD 108 is a partial or non-continuous layer. BDD 108 does not completely cover outer surface 106 of refractory catalyst support structure 102 so that islands of BDD 108 are formed on outer surface 106. The non-continuous layer of BDD 108 means refractory catalyst support structure 102 may be exposed at outer surface 116 and to the environment surrounding catalyzed catalyst support structure 114. As explained above, BDD 108 improves the stability of catalyst support structure 114. For example, BDD 108 provides corrosion resistance when catalyst support structure 114 is used in the presence of water, oxygen, and high electrode potential.

Catalyst particles 110 are dispersed on and engaged with refractory catalyst support structure 102 and BDD 108. Example catalyst particles 110 include platinum particles, binary, ternary or quaternary platinum alloys and combinations thereof. Catalyst particles 110 can be located on outer surface 106 between the islands of BDD 108. When refractory catalyst support structure 102 is exposed, catalyst particles 110 will preferentially bond to refractory catalyst support structure 102. Catalyst particles 110 can also be dispersed on BDD 108.

Refractory catalyst support structure 102 stabilizes catalyst particles 110 on the catalyst support due to the strong metal-support interaction (SMSI) characteristics of the refractory material. The SMSI characteristics of refractory catalyst support structure 102 enhance the oxidation reduction reaction (ORR) activities of the catalyst by preventing movement of catalyst particles 110 under dissolution/redeposition. Additionally, the ORR activity of platinum (Pt) catalyst particles 110 is dependent on the surface coverage with oxides. When catalyst particles 110 are platinum, the refractory material further enhances the ORR activities of the catalyst by lowering oxide coverage on Pt.

BDD 108 provides corrosion resistance, especially at high potentials, as discussed above, and plays a significant role in balancing the physical properties, such as the hydrophilicity and hydrophobicity properties, of catalyzed catalyst supports 114. These physical properties are important for water and reactant management during use in an electrochemical device, such as a fuel cell. Additionally, as noted earlier, some refractory materials, such as metal phosphates and metal oxides, are non-conductive. When these refractory materials are present in refractory catalyst support structure 102, BDD 108 provides the necessary conductivity for refractory catalyst support structure 102.

Figure 4:
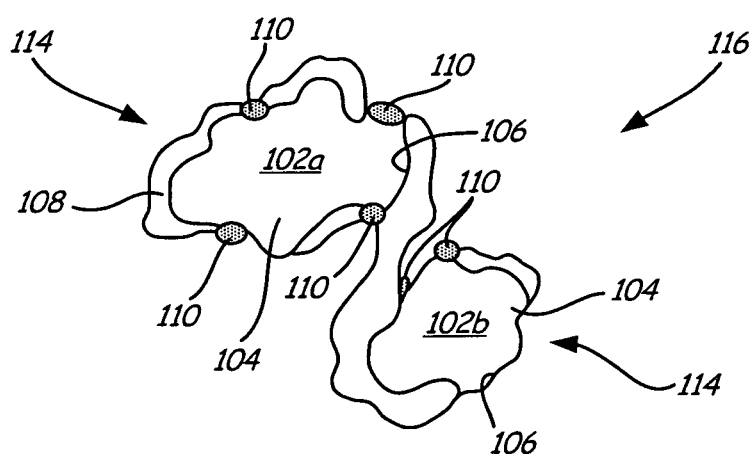
FIG. 4 is a cross-sectional view of two catalyzed catalyst structures of FIG. 3 connected by BDD.

FIG. 4 illustrates the interaction of two catalyzed catalyst supports 114 of FIG. 3. FIG. 4 is a cross-section of first high surface area refractory catalyst support structure 102a and second high surface area refractory catalyst support structure 102b, which each include inner surface 104, outer surface 106, BDD 108 and catalyst particles 110. Refractory catalyst support structures 102a, 102b are modified with a non-continous layer of BDD 108. Additionally, BDD 108 joins first refractory catalyst support structure 102a to second refractory catalyst support structure 102b. Catalyst particles 110 are dispersed on refractory catalyst support structures 102a, 102b.

Refractory catalyst support structures 102a, 102b are formed from a high surface area refractory material such as metal oxides, metal phosphates, metal borides, metal nitrides, metal silicides and metal carbides. Example refractory material includes $TiO_2$, $ZrO_2$, $WO_3$, $TaO_2$, $Nb_2O_3$, $TaPO_x$, $BPO_x$, $ZrPO_x$, $TiPO_x$, $TiB_2$, TiC, WC, WSi, BC, BN, SiC, ZrN, $TaB_2$ and NbC.

The high surface area of refractory material of refractory catalyst support structures 102a, 102b provides an increased surface area for the dispersion of catalyst particles 110. In one example, the refractory materials have a surface area between about 10 and about 2000 $m^2/g$. The increased surface area increases the catalyst dispersion and, as a result, increases the ORR activity of catalyst particles 110 on refractory catalyst support structures 102a, 102b.

As illustrated in FIG. 4, BDD 108 is a non-homogenous layer that partially covers outer surface 106 of first refractory catalyst support structure 102a and second refractory catalyst support structure 102b. BDD 108 covers only selected portions of outer surface 106 so that islands of BDD 108 are formed. A mixed structure of BDD 108 and refractory catalyst support structures 102a, 102b can be exposed to the environment surrounding catalyzed catalyst support structures 114. Additionally, BDD 108 extends from first catalyst support structure 102a to second catalyst support structure 102b so that first and second catalyst support structures 102a, 102b are connected.

Catalyst particles 110 are deposited on BDD 108. Additionally or alternatively, catalyst particles 110 can be deposited on outer surface 106 such that catalyst particles 110 are located between the islands of BDD 108. Further, as illustrated in FIG. 4, portions of outer core 106 may not be covered by either BDD 108 or catalyst particles 110 such that refractory catalyst support structures 102a, 102b are exposed to the environment surrounding catalyzed catalyst support structures 114.

The refractory material of catalyst support structures 102a, 102b provides increased SMSI characteristics, which enhances the ORR activities and the stability of catalyst particles 110. For example, the increased SMSI characteristics decreases or eliminates movement of catalyst particles 110 under a dissolution/redeposition process and, when catalyst particles 110 are platinum, lowers the oxide coverage on catalyst particles 110.

BDD 108 provides corrosion resistance. Catalyst supports without BDD 108 can experience corrosion (oxidation) due to potential cycling in a fuel cell. This is a particular problem when conductive refractory materials, such as metal metal carbides and metal borides, are present. Support material corrosion leads to irreversible loss in fuel cell performance and can ultimately lead to the failure of the fuel cell. The corrosion resistance of BDD 108 is especially noticeable at high potential. BDD 108 maintains the fuel cell performance by maintaining the electrode integrity and activity. BDD 108 also provides the necessary conductivity property on outer surface 106 of catalyst support structures 102a, 102b. Further, BDD 108 plays a significant role in balancing the physical properties, such as the hydrophilicity and hydrophobicity properties, of catalyzed catalyst supports 114. These physical properties are important for water and reactant management during use in an electrochemical device, such as a fuel cell.

High surface area refractory catalyst support structures 102 having BDD 108 can be formed in a reactor using the following method. The conditions of the reactor can be varied to produce catalyst support structures having a continuous layer of BDD 108 or a non-continuous layer of BDD 108. Following the deposition of BDD on the high surface area refractory material catalyst support structures, catalyst particles can be deposited using known methods to form a catalyzed catalyst support structure.

A method of forming modified high surface area refractory material catalyst support structures includes introducing a powder refractory material into a BDD reactor and applying microwave plasma assisted chemical vapor deposition (MW-PACVD). First, the refractory material is introduced into a BDD reactor. In one example the refractory material is the metal oxide titanium dioxide ($TiO_2$). Next, a mixture of gas consisting of methane ($CH_4$), diborane ($B_2H_6$), hydrogen ($H_2$) and argon (Ar) is supplied to the reactor chamber and MWPACVD is applied. The power of the plasma generator is maintained at 700 watts and the pressure is adjusted to 140 torr before deposition. During MWPACVD, radicals such as $CH_3$, H and $BH_2$ are generated in the plasma and reacted on the surface of the $TiO_2$, leading to formation of a BDD layer.

For metal oxides, MWPACVD occurs in two steps. First, a high flow of $H_2$ and $CH_4$ gas is introduced in the reactor for a 30 minute. In the second step, the flow of $H_2$ and $CH_4$ gas is reduced for two hours. It is believed that in the first step of the MWPACVD, a layer of oxide is reduced into a mixture of metal carbide, oxo-carbide and perhaps boride before BDD deposits. Following MWPACVD, x-ray diffraction (XRD) analysis confirmed the presence of titanium carbide (TiC).

Although the present invention has been described with reference to preferred embodiments, workers skilled in the art will recognize that changes may be made in form and detail without departing from the spirit and scope of the invention.

The invention claimed is:
1. A polymer electrolyte fuel cell, comprising:
   a catalyst layer having a catalyst support that comprises:
      a high surface area refractory material core structure having an outer surface, wherein the high surface area refractory material core structure contains at least one compound selected from the group consisting of metal oxides, metal phosphates, metal borides, metal nitrides, metal silicides, metal carbides and combinations thereof; and boron-doped diamond (BDD) modifying the high surface area refractory material core structure, wherein the BDD forms a layer that covers a majority of the outer surface of the core structure.

2. The polymer electrolyte fuel cell of claim 1, wherein the high surface area refractory material core structure of the catalyst support has a surface area between about 10 and about 2000 m$^2$/g.

3. The polymer electrolyte fuel cell of claim 1, wherein the high surface area refractory material core structure of the catalyst support contains at least one compound selected from the group consisting of $TiO_2$, $ZrO_2$, $WO_3$, $TaO_2$, $Nb_2O_3$, $TaPO_x$, $BPD_x$, $ZrPO_x$, $TiPO_x$, $TiB_2$, TiC, WC, WSi, BC, BN, SiC, ZrN, $TaB_2$ and NbC.

4. The polymer electrolyte fuel cell of claim 1, wherein the BDD is a continuous layer on the outer surface of the high surface area refractory material core structure.

5. The polymer electrolyte fuel cell of claim 1, wherein the BDD of the catalyst support is a non-continuous layer on the outer surface of the high surface area refractory material core structure.

6. The polymer electrolyte fuel cell of claim 1, wherein the BDD of the catalyst support has a conductivity greater than about 0.05 Siemens/centimeter (S/cm) at temperatures equal to or greater than about 100° C.

7. The polymer electrolyte fuel cell of claim 1, wherein the BDD of the catalyst support has a conductivity greater than about 0.1 Siemens/centimeter (S/cm) at temperatures equal to or less than about 100° C.

8. The polymer electrolyte fuel cell of claim 1, wherein the catalyst layer further comprises:
a catalyst deposited onto the catalyst support.

9. The polymer electrolyte fuel cell of claim 8, wherein the catalyst is selected from the group consisting of platinum and binary, ternary and quaternary platinum alloys.

10. The polymer electrolyte fuel cell of claim 8, wherein the BDD of the catalyst support is a continuous layer on the outer surface of the high surface area refractory material core structure.

11. The polymer electrolyte fuel cell of claim 8, wherein the BDD of the catalyst support is a non-continuous layer on the outer surface of the high surface area refractory material core structure.

12. A fuel cell comprising:
an anode;
a cathode;
an anode catalyst layer; and
a cathode catalyst layer, wherein at least one of the anode catalyst layer and the cathode catalyst layer comprise:
a catalyst support structure including a high surface area refractory material core structure having an outer surface, wherein the high surface area refractory material core structure contains at least one compound selected from the group consisting of metal oxides, metal phosphates, metal borides, metal nitrides, metal silicides, metal carbides and combinations thereof;
boron-doped diamond (BDD) modifying the high surface area refractory material core structure, wherein the BDD forms a layer that covers a majority of the outer surface of the core structure; and
catalyst particles dispersed on the catalyst support structure.

13. The fuel cell of claim 12, wherein the high surface area refractory material core structure contains at the at least one compound selected from the group consisting of $TiO_2$, $ZrO_2$, $WO_3$, $TaO_2$, $Nb_2O_3$, $TaPO_x$, $BPD_x$, $ZrPO_x$, $TiPO_x$, $TiB_2$, TiC, WC, WSi, BC, BN, SiC, ZrN, $TaB_2$ and NbC.

14. The fuel cell according to claim 12, wherein the BDD is a continuous layer on the outer surface of the high surface area refractory material core structure.

15. The fuel cell according to claim 12, wherein the BDD is a non-continuous layer on the outer surface of the high surface area refractory material core structure.

16. The fuel cell of claim 12, wherein the catalyst is selected from the group consisting of platinum and binary, ternary and quaternary platinum alloys.

* * * * *

UNITED STATES PATENT AND TRADEMARK OFFICE
CERTIFICATE OF CORRECTION

PATENT NO. : 9,065,141 B2
APPLICATION NO. : 13/148552
DATED : June 23, 2015
INVENTOR(S) : Belabbes Merzougui et al.

It is certified that error appears in the above-identified patent and that said Letters Patent is hereby corrected as shown below:

Claims

Column 7, Line 13, Claim 3:
"$TaPO_x$, $BPD_x$, $ZrPO_x$, $TiPO_x$, $TiB_2$, TiC, WC, WSi, BC, BN," should read, --$TaPO_x$, $BPO_x$, $ZrPO_x$, $TiPO_x$, $TiB_2$, TiC, WC, WSi, BC, BN,--.

Column 8, Line 27, Claim 13:
"$WO_3$, $TaO_2$, $Nb_2O_3$, $TaPO_x$, $BPD_x$, $ZrPO_x$, $TiPO_x$, $TiB_2$, TiC," should read, --$WO_3$, $TaO_2$, $Nb_2O_3$, $TaPO_x$, $BPO_x$, $ZrPO_x$, $TiPO_x$, $TiB_2$, TiC,--.

Signed and Sealed this
Fifth Day of April, 2016

Michelle K. Lee
*Director of the United States Patent and Trademark Office*